United States Patent [19]
Hummert

[11] 3,727,129
[45] Apr. 10, 1973

[54] LOGARITHMIC-RESPONSE CORONA DETECTOR

[75] Inventor: George T. Hummert, Verona, Pa.

[73] Assignee: Westinghouse Electric Corporation, Pittsburgh, Pa.

[22] Filed: Feb. 5, 1971

[21] Appl. No.: 112,975

[52] U.S. Cl. ............... 324/54, 324/132, 328/145
[51] Int. Cl. ..................... G01r 15/10, G01r 31/12
[58] Field of Search ................... 324/54, 132, 72; 328/145

[56] References Cited

UNITED STATES PATENTS

| | | | |
|---|---|---|---|
| 3,500,198 | 3/1970 | Kaiser et al. | 328/145 X |
| 3,114,078 | 12/1963 | Waldvogel et al. | 324/132 X |
| 3,120,647 | 2/1964 | Bravenec | 328/145 X |
| 3,579,127 | 5/1971 | Thomas | 328/145 |
| 3,483,475 | 12/1969 | Mitchell | 328/145 |
| 2,802,180 | 8/1957 | Nye | 324/54 X |

*Primary Examiner*—Gerard R. Strecker
*Attorney*—A. T. Stratton and F. E. Browder

[57] ABSTRACT

Apparatus for detecting and measuring corona discharges. A sensing circuit is connected to the apparatus, material or sample which is being tested. The output of the sensing circuit is connected to a detector which converts the corona produced pulse signal from the sensing circuit into a voltage which can be observed. The response of the detector circuit is such that the output voltage thereof is approximately equal to the logarithm of the input voltage produced by the corona discharge. The amplitude of the pulse may be observed by an oscilloscope, a chart recorder, or a meter.

4 Claims, 5 Drawing Figures

WITNESSES

INVENTOR
George T. Hummert

BY F. E. Browder
ATTORNEY

LOGARITHMIC-RESPONSE CORONA DETECTOR

BACKGROUND OF THE INVENTION

1. Field of the Invention

This invention relates, in general, to detection and measurement of corona discharges, and more particularly, to the detection and measurement of corona discharges which have a wide range of magnitudes.

2. Description of the Prior Art

The importance of measuring corona is increasing due to the trend of using higher distribution voltages for power transmission. Not only is it important to test dielectric material in the laboratory for corona discharges, but it is becoming increasingly important to test manufactured equipment for corona discharges. The increasing use of present corona discharge measuring equipment has made it necessary to develop corona testing equipment which is easier to use and yields better and more accurate results.

Corona discharges are converted into high frequency voltage oscillations by an inductor and capacitor combination which is coupled into the circuit or device being tested. The amplitude of the corona produced voltage is measured or detected by a high gain linear pulse amplifier, a radio noise meter, or an oscilloscope. In the first method the corona signal is amplified and the peak voltage is converted to a dc signal suitable for meter or chart recorder display. Although this method is sensitive and easily responds to single or infrequent corona pulses, the scale setting must be adjusted to accommodate changes in the amplitude of the corona pulses. Not only does this require constant surveillance, but sudden bursts of high amplitude corona pulses saturate the amplifier and drive the meter or recorder off scale.

The radio noise meter method uses a narrow band amplifier tuned to a radio-frequency near that of the resonant frequency of the sensing circuit. Conventional radio noise meters of this type have a logarithmic output scale which gives a two-decade response. The response, however, is dependent on the repetition rate of the corona pulses. The noise meter does not respond accurately to infrequent or bursts of corona pulses.

Using an oscilloscope to monitor corona pulses requires constant operator attendance to make gain adjustments and visually observe the amplitudes. Sudden bursts or infrequent high amplitude pulses saturate the vertical amplifier of the oscilloscopes and the amplitude information is lost.

SUMMARY OF THE INVENTION

The logarithmic-response corona detector described in this invention measures corona pulses over a four decade range at one gain setting, and has equivalent steady state and single pulse responses. Therefore, by continuously monitoring the output on a chart recorder, one may easily detect infrequent or intermittent corona bursts containing pulses of several thousand times the minimum detectable amplitude.

The four decade response characteristics of the logarithmic detector of this invention is obtained by the use of a logarithmic pulse amplifier which amplifies the corona produced pulse voltages. The logarithmic amplifier circuit consists of an operational amplifier and a diode feedback circuit. The output voltage of the logarithmic amplifier is proportional to the logarithm of the input voltage. The output of the logarithmic amplifier is applied through a buffer amplifier to a peak detector circuit which measures the amplitude of the pulse. The output of the peak detector circuit is amplified and displayed on a meter or chart recorder. By using the detector circuit described in this invention it is possible to observe accurately corona pulses having a wide range of amplitudes.

BRIEF DESCRIPTION OF THE DRAWING

Further advantages and uses of the invention will become more apparent when considered in view of the following detailed description and drawings, in which.

DESCRIPTION OF THE PREFERRED EMBODIMENTS

Figure 1:
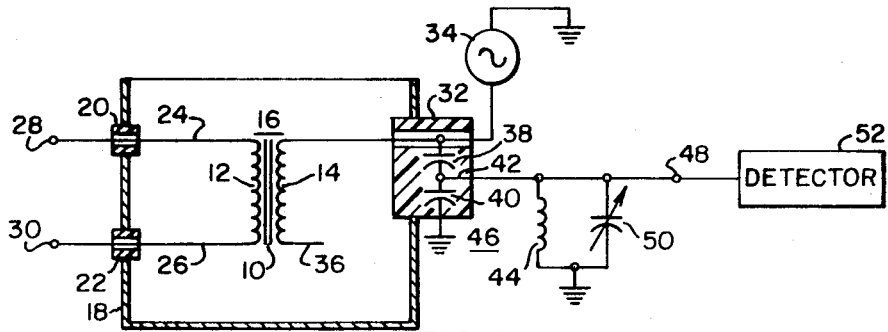
FIG. 1 is a schematic circuit diagram of an electrical inductive apparatus with connections thereto for making corona discharge measurements.

Throughout the following description similar reference characters refer to similar members in all figures of the drawing.

Referring now to the drawing, and FIG. 1 in particular, there is shown schematically an electrical inductive device such as a high voltage power transformer, with components attached thereto for corona measurement tests. A magnetic core 10 inductively couples a low voltage winding 12 and a high voltage winding 14. The core and winding assembly 16 is enclosed within a metallic case 18 which has low voltage bushings 20 and 22 extending therethrough. The low voltage winding 12 has leads 24 and 26 which are connected to the low voltage bushings 20 and 22 respectively. The low voltage bushing terminals 28 and 30 provide means for connecting a load to the low voltage winding 12.

The high voltage winding 14 is electrically connected to a high voltage source 34 through high voltage bushing 32. Corona measurement tests can be made by stressing the insulation between the high voltage coil 14 and the grounded portions of the transformer, thus having a current flow in the high voltage winding is not necessary. High voltage winding current is eliminated by not grounding the winding 14 at 36.

The high voltage bushing 32 contains conventional stress grading plates which function as capacitive elements and are represented by capacitors 38 and 40. Since the outermost plate of the high voltage bushing is grounded, the series combination of the plates is effectively a capacitive voltage divider circuit. The voltage provided by the voltage divider circuit at point 42 is low enough to permit the attachment of the external components necessary to detect corona. A corona discharge in the high voltage circuit produces a sharp voltage pulse at point 42. Inductor 44 appears as a high impedance to the corona produced voltage pulse and does not appreciably attenuate the corona pulse. However, since the frequency characteristics of the testing voltage is much lower than the frequency characteristics of the corona pulse, the inductor 44 provides a relatively low impedance path for the testing voltage. The inductive and capacitive elements of the pulse sensing circuit 46 cause a corona pulse to appear as an oscillating voltage at terminal 48. Capacitor 50 is either adjustable or of a suitable fixed value to stabilize the frequency of oscillation within the limits of the detection equipment 52 connected to terminal 48.

Figure 2:
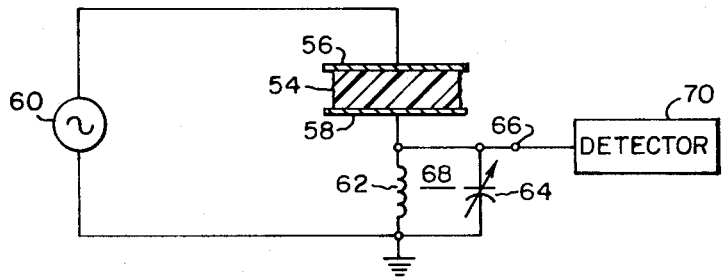
FIG. 2 is a schematic circuit diagram of a laboratory method for measuring the corona discharges of a dielectric material.

FIG. 2 illustrates a circuit configuration which may be used in a laboratory test of an insulation material for corona discharges. A material sample 54 being tested is placed between plates 56 and 58. The plate 56 is connected to one terminal of a high voltage generator 60. The plate 58 is connected to the other terminal of generator 60 through the parallel combination of inductor 62 and capacitor 64. The inductor 62 and capacitor 64 combination forms a sensing circuit 68 which functions similarly to the sensing circuit 46 shown in FIG. 1. The sensing circuit 68 filters the voltage components from the generator 60 and sets up voltage oscillations when a corona pulse occurs. The oscillating corona voltage at terminal 66 is examined by a detector 70.

The detectors 52 and 70 shown in FIGS. 1 and 2, respectively, may be similar and may utilize the detector apparatus described in this invention.

Figure 3:
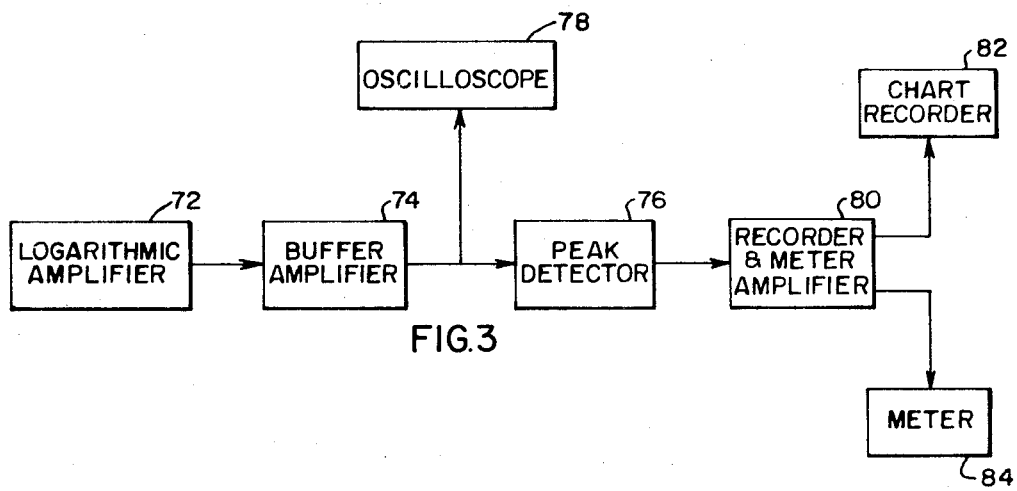
FIG. 3 is a block diagram illustrating the logarithmic corona detector of this invention.

FIG. 3 is a block diagram illustrating the circuit of the detector disclosed herein. The oscillating corona pulse voltage is applied to a logarithmic amplifier 72 which will be described in detail later. The logarithmic amplifier responds to the negative half cycle of the input voltage. The output voltage of the logarithmic amplifier is approximately equal to the logarithm of the input voltage. Therefore, an oscillating voltage input to the logarithmic amplifier 72 produces a pulsating output voltage with the peak amplitude of the output voltage being proportional to the logarithm of the negative half cycle input voltage peak. The dampening characteristic of the logarithmic amplifier decreases the input oscillations, therefore the output oscillates for only a few cycles.

The logarithmic amplifier 72 output voltage is injected into a buffer amplifier 74 which reduces the effects of the remaining circuit stages on the logarithmic amplifier. An oscilloscope 78 may be used to monitor the voltage pulses at this point. The pulse output voltage from the buffer stage 74 is applied to a peak detector stage 76. The peak detector stage produces an output voltage which is proportional to the peak of the input voltage pulse and of sufficient duration to permit display. An amplifier 80 increases the voltage level to permit display of the voltage on a chart recorder 82 or meter 84.

Figure 4:
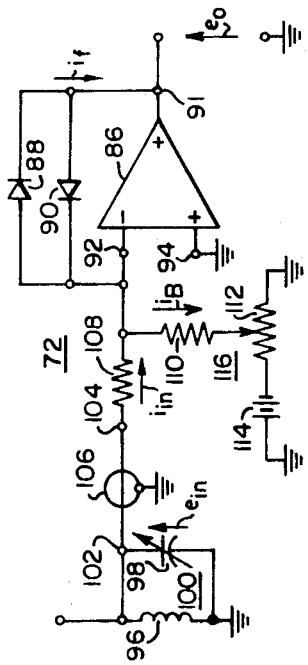
FIG. 4 is a schematic circuit diagram of the logarithmic amplifier used in the corona detector of this invention; and, FIG. 5 is a schematic circuit diagram of a corona discharge detector constructed according to the teachings of this invention.

FIG. 4 represents a simplified circuit diagram of the elements comprising the logarithmic amplifier 72. An operational amplifier 86 of the differential input type is connected to diodes 88 and 90. The diodes are connected between the output terminal 91 and the inverting input terminal 92 of the operational amplifier 86. The non-inverting input terminal 94 of the operational amplifier is connected to ground.

An inductor 96 and a capacitor 98 form a corona pulse sensing circuit 100 which is positioned near the specimen or sample being tested. The sensing circuit 100 is shown in FIG. 4 for completeness and is equivalent to the sensing circuits 46 and 68 shown in FIGS. 1 and 2, respectively. Electrical coupling between point 102 of the sensing circuit 100 and point 104 of the logarithmic amplifier 72 is accomplished by a coaxial cable 106. A resistor 108 completes the circuit path for the input current. Resistors 110 and 112, and voltage source 114 form a biasing network for the logarithmic amplifier.

Due to the high gain of the operational amplifier, the feedback current $i_f$ is essentially equal to the input current $i_{in}$, and the voltage between the inverting and non-inverting input terminals 92 and 94, respectively, is equal to zero. This produces a "virtual" ground at the inverting input terminal 92. The resistor 108 functions as a dampening resistance to reduce the duration time of oscillations from the corona sensing circuit 100. This is necessary since adequate corona measurements cannot be obtained for corona pulses occurring before the oscillations induced by the previous pulse are substantially reduced.

Referring to the voltage polarities and the current directions indicated by the pertinent arrows in FIG. 4, a negative input voltage $e_{in}$ produces a negative input current $i_{in}$. Since the input and feedback currents are essentially equal, the feedback current $i_f$ will be negative. Diode 90 becomes forwardly biased. Since the input terminal 92 is at "virtual" ground, the voltage across diode 90 is equal to the output voltage $e_o$. The voltage-current characteristics of a forwardly biased diode are inherently logarithmic, therefore the output voltage $e_o$ is proportional to the logarithm of the feedback current $i_f$. The input current $i_{in}$ and the input voltage $e_{in}$ are proportional, and the input current $i_{in}$ and the feedback current $i_f$ are equal, hence the output voltage $e_o$ is proportional to the logarithm of the input voltage $e_{in}$. When a corona produced pulse current flows in the resistor 108, an output voltage pulse $e_o$ develops which is proportional to the logarithm of the corona pulse.

The peak detector stage 76 functions only when a positive pulse is applied to the peak detector, therefore, because of the inverting properties of the logarithmic amplifier, only the negative portion of the dampened corona produced pulses entering the logarithmic amplifier are measured. Diode 88 provides a current path for positive pulses and effectively bypasses the input circuit so that the logarithmic amplifier will not become saturated with a positive pulse.

A biasing network 116 comprising a voltage source 114 and resistance elements 110 and 112 establishes bias current $i_B$. Because of the biasing current $i_B$, the diode 90 is forwardly biased when no input current $i_{in}$ is present. This condition determines a quiescent point on the characteristic curve of the diode 90 which produces a more uniform logarithmic output voltage $e_o$ than without fixed diode bias.

Figure 5:
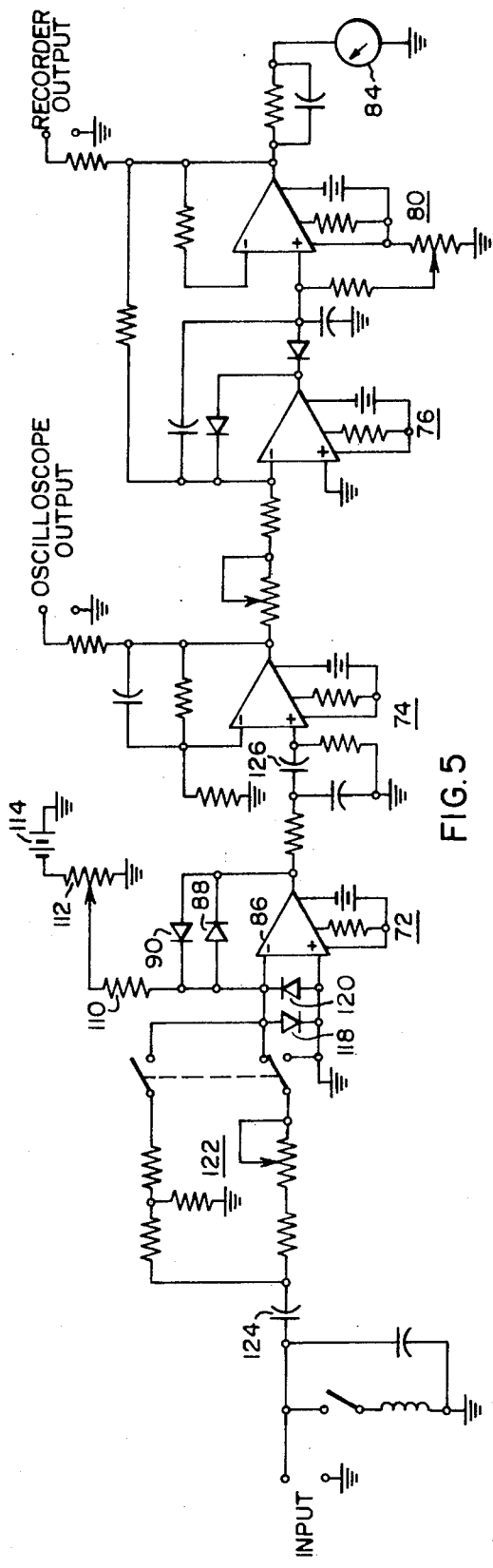

FIG. 5 is a schematic circuit diagram of a detector device constructed according to the teachings of this invention. A corona produced pulse current is transmitted by capacitor 124 to the dampening circuit 122. Diodes 118 and 120 protect the logarithmic amplifier circuit from excessive input voltages.

The logarithmic amplifier stage 72 and the buffer stage 74 are capacitively coupled by capacitor 126. This reduces the variation of the signal response to ambient temperature fluctuations. Since the logarithmic voltage current characteristics of semiconductor diodes are inherently temperature sensitive, the output bias voltage which is due to the bias current $i_B$ varies inversely with temperature changes. For the same reason, the signal peak due to any given corona pulse input will vary with temperature. By capacitively coupling the logarithmic amplifier 72 and the buffer stage 74, only the difference between the signal peak and the DC level appears in the detected signal. The percentage change in the difference voltage from the logarithmic amplifier due to temperature fluctuations is less than the percentage change in the absolute signal voltage due to the temperature fluctuations. Therefore, the biasing and coupling arrangements taught by this invention provide a simple and satisfactory stabilizing method.

The response of the detector with the circuit of FIG. 5 was substantially logarithmic over four decades of corona pulse magnitudes and the temperature sensitivity was on the order of 0.33 percent per degree C.

I claim:

1. A logarithmic-response corona pulse detector comprising a logarithmic-response amplifier, a buffer amplifier capacitively coupled to said logarithmic-response amplifier, a peak detector connected to the output of said buffer amplifier, said peak detector producing an output proportional to the peak of the input to said peak detector, an amplifier driven by the output of said peak detector, the output of said amplifier being suitable for connection to indicating means, said logarithmic-response amplifier comprising a differential input operational amplifier having an inverting input terminal, a non-inverting input terminal, and an output terminal, said non-inverting input terminal being grounded, a first diode connected between said inverting input terminal and said output terminal of said operational amplifier, a second diode connected between said inverting input terminal and said output terminal of said operational amplifier, said second diode having its forward conduction direction opposite that of said first diode, means providing a biasing current at said inverting input terminal of said operational amplifier, and a dampening impedance element with one end connected to said inverting input terminal of said operational amplifier and the other end connected to means applying an input signal voltage to said operational amplifier.

2. the logarithmic-response corona pulse detector of claim 1 wherein the means providing a biasing current comprises a biasing resistance element and a source of adjustable negative polarity voltage, one end of said biasing resistance element being connected to the inverting terminal of the operational amplifier, and the other end of said biasing resistance element being connected to said adjustable negative polarity voltage source.

3. The logarithmic-response corona pulse detector of claim 1 wherein the input signal voltage is applied to the dampening impedance element of the logarithmic amplifier, said input signal voltage being developed across a parallel inductor-capacitor circuit connected serially with a high voltage source and a sample being measured for corona discharge.

4. A device for detecting corona discharge from an electrical inductive apparatus having a bushing, said device comprising the logarithmic-response corona pulse detector of claim 1, a parallel inductor-capacitor circuit having first and second terminals, a first terminal of said parallel inductor-capacitor circuit being connected to the dampening impedance of said detector and also to a point on a capacitive voltage divider circuit of said bushing on said electrical inductive apparatus, the second terminal of said parallel inductor-capacitor circuit being connected to a point at ground potential.

* * * * *